(12) United States Patent
Iikura

(10) Patent No.: US 10,459,365 B2
(45) Date of Patent: Oct. 29, 2019

(54) INFORMATION PROCESSING APPARATUS AND IMAGE FORMING APPARATUS

(71) Applicant: CANON KABUSHIKI KAISHA, Tokyo (JP)

(72) Inventor: Takayuki Iikura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/264,037

(22) Filed: Jan. 31, 2019

(65) Prior Publication Data

US 2019/0243278 A1    Aug. 8, 2019

(30) Foreign Application Priority Data

Feb. 6, 2018   (JP) .................................. 2018-019475

(51) Int. Cl.
  *G03G 15/043*   (2006.01)
  *G03G 15/04*    (2006.01)
  *G02B 26/12*    (2006.01)

(52) U.S. Cl.
  CPC ....... *G03G 15/0435* (2013.01); *G02B 26/127* (2013.01); *G03G 15/04072* (2013.01)

(58) Field of Classification Search
  CPC ......... G03G 15/0435; G03G 15/04072; G02B 26/127
  See application file for complete search history.

(56) References Cited

U.S. PATENT DOCUMENTS

| | | | |
|---|---|---|---|
| 9,575,314 B2 | 2/2017 | Araki | |
| 2008/0124125 A1* | 5/2008 | Hirano | G03G 15/326 399/151 |
| 2016/0238963 A1* | 8/2016 | Nemoto | G02B 26/127 |
| 2017/0280001 A1* | 9/2017 | Furuta | H04N 1/2346 |

* cited by examiner

*Primary Examiner* — Gregory H Curran
(74) *Attorney, Agent, or Firm* — Canon U.S.A., Inc. IP Division

(57) ABSTRACT

An image forming unit includes a first receptor, a light source, a photosensitive member, a rotational polygon mirror, a light receiving unit, an identifier configured to identify a reflection face, and a generator. An information processing apparatus includes a second receptor, a first detector, a second detector, a determiner, a corrector configured to correct image data, and an output unit configured to output corrected image data to the image forming unit. When the first change is newly detected in a predetermined period, the determiner determines, based on a time period from the second timing at which the first change is newly detected to a timing at which the second change is detected and a time period from the first timing to a timing at which the second change is lastly detected before the second timing, whether the first change is a change corresponding to the identified reflection face.

20 Claims, 10 Drawing Sheets

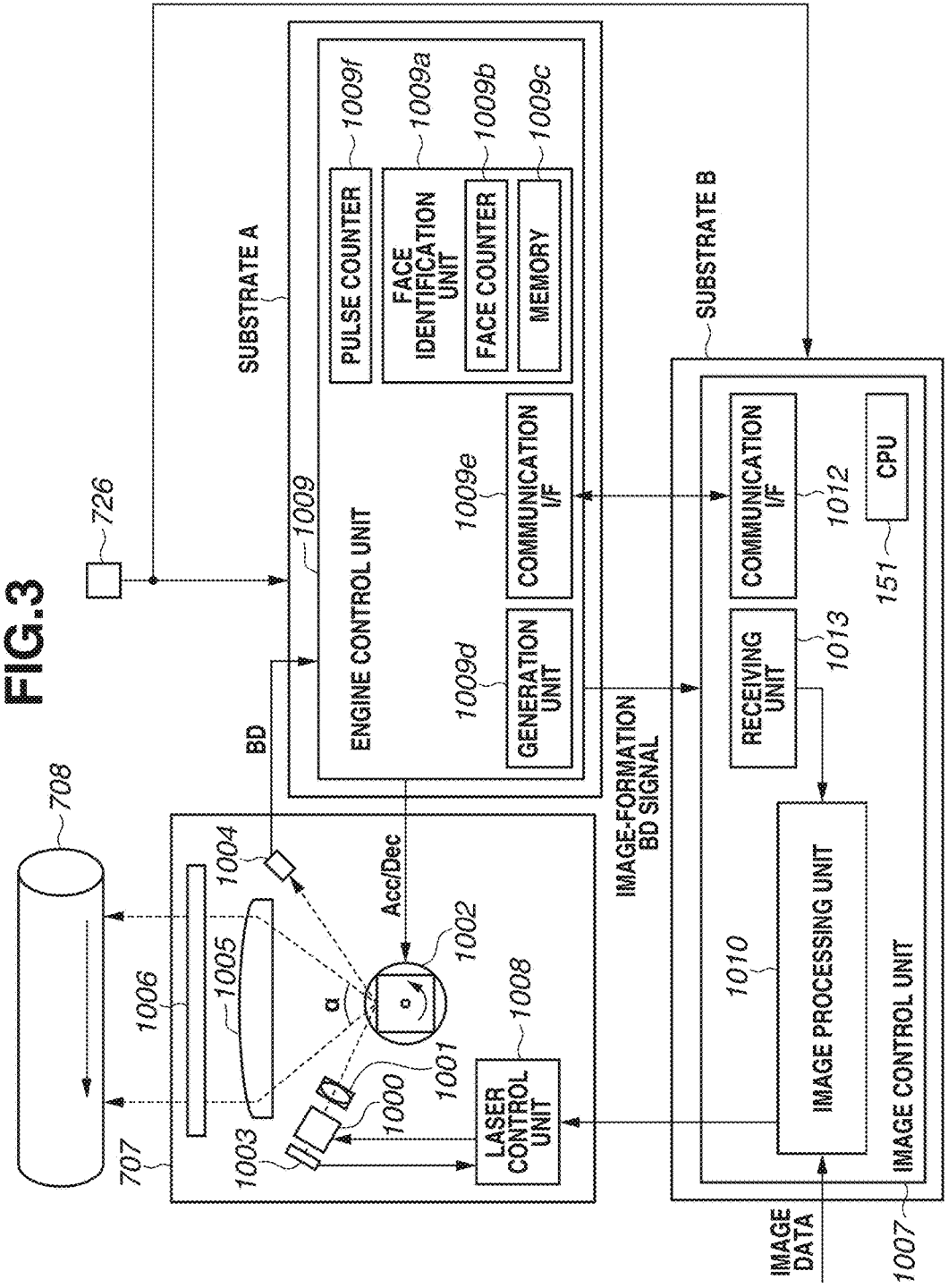

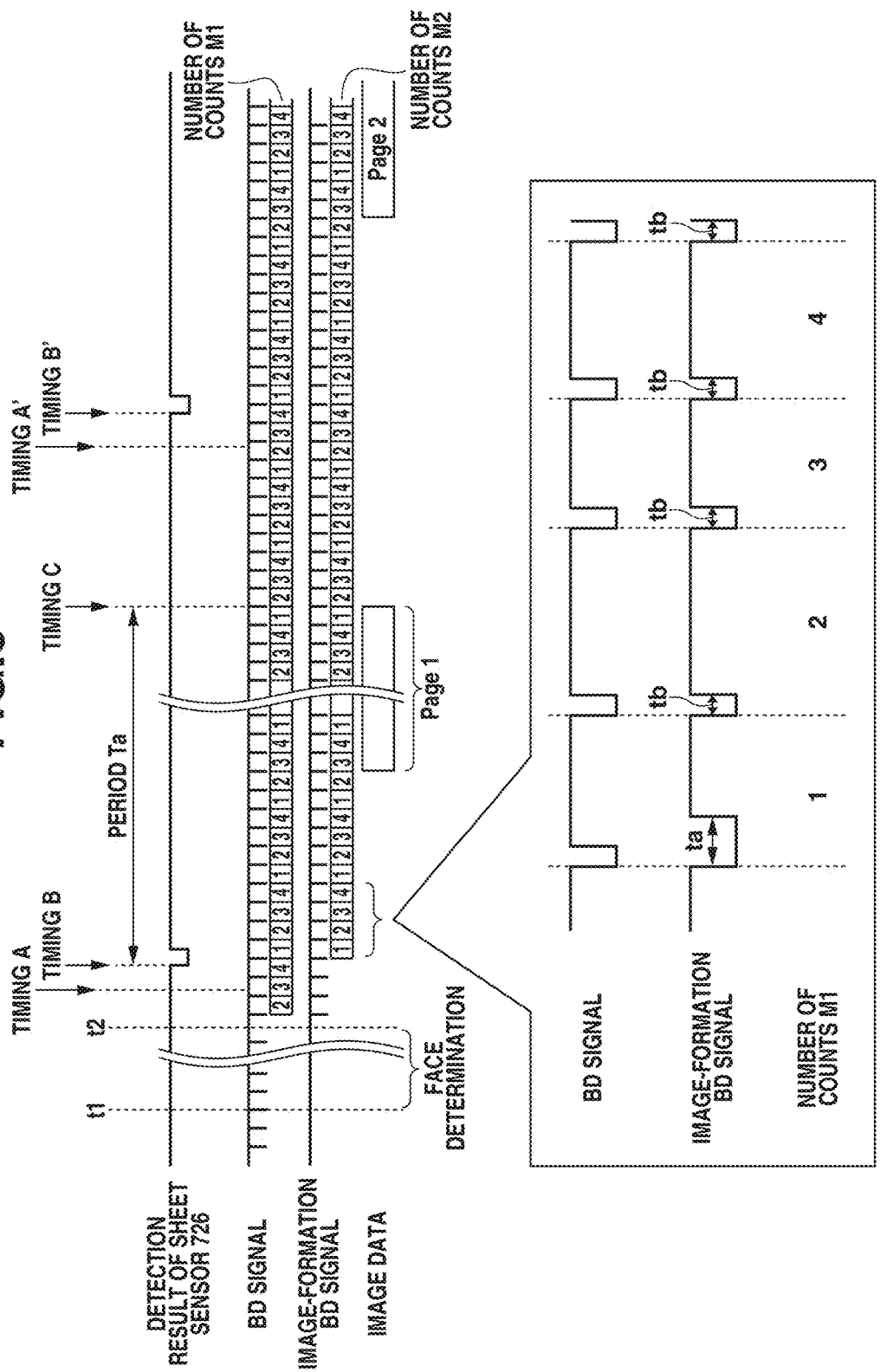

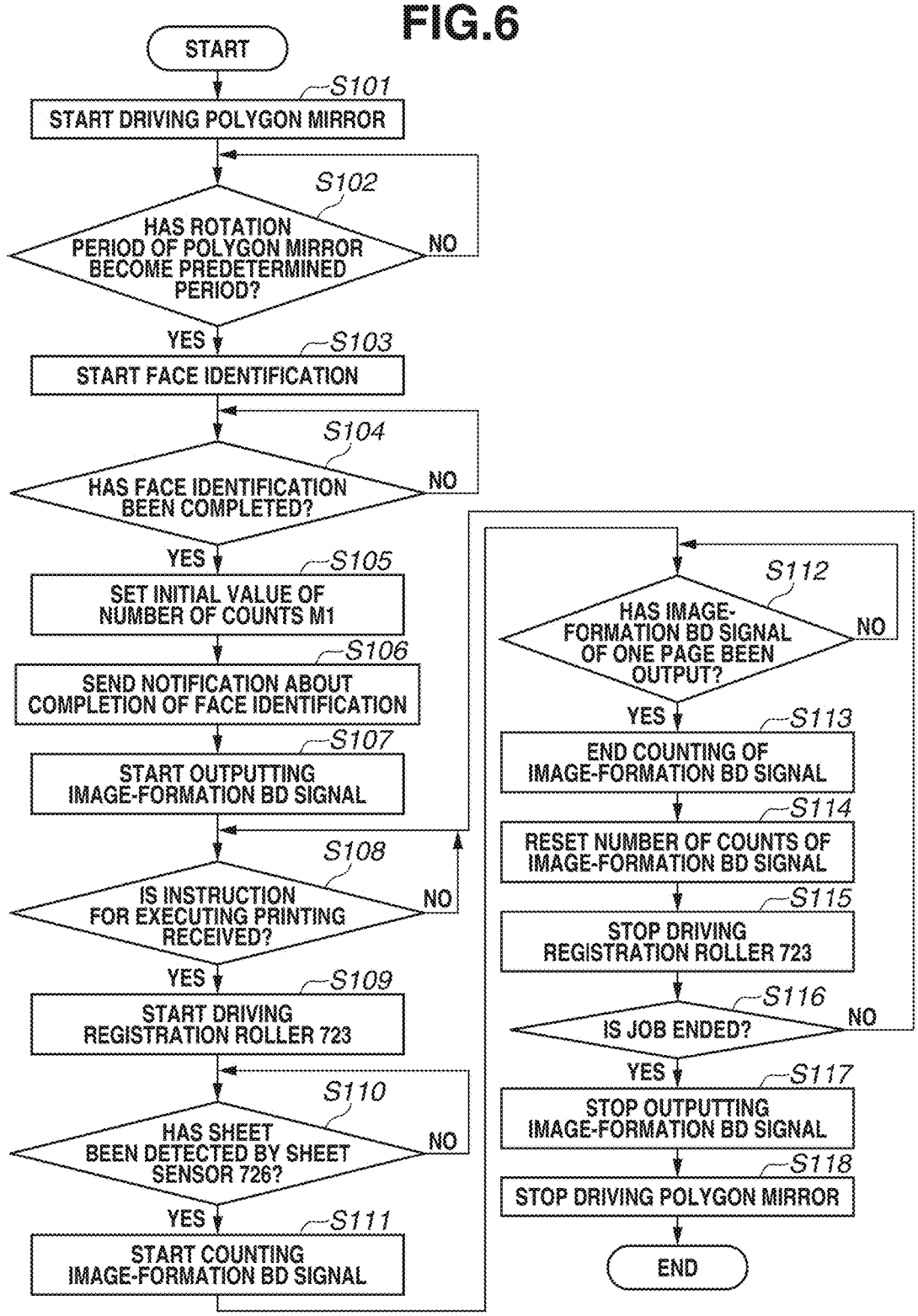

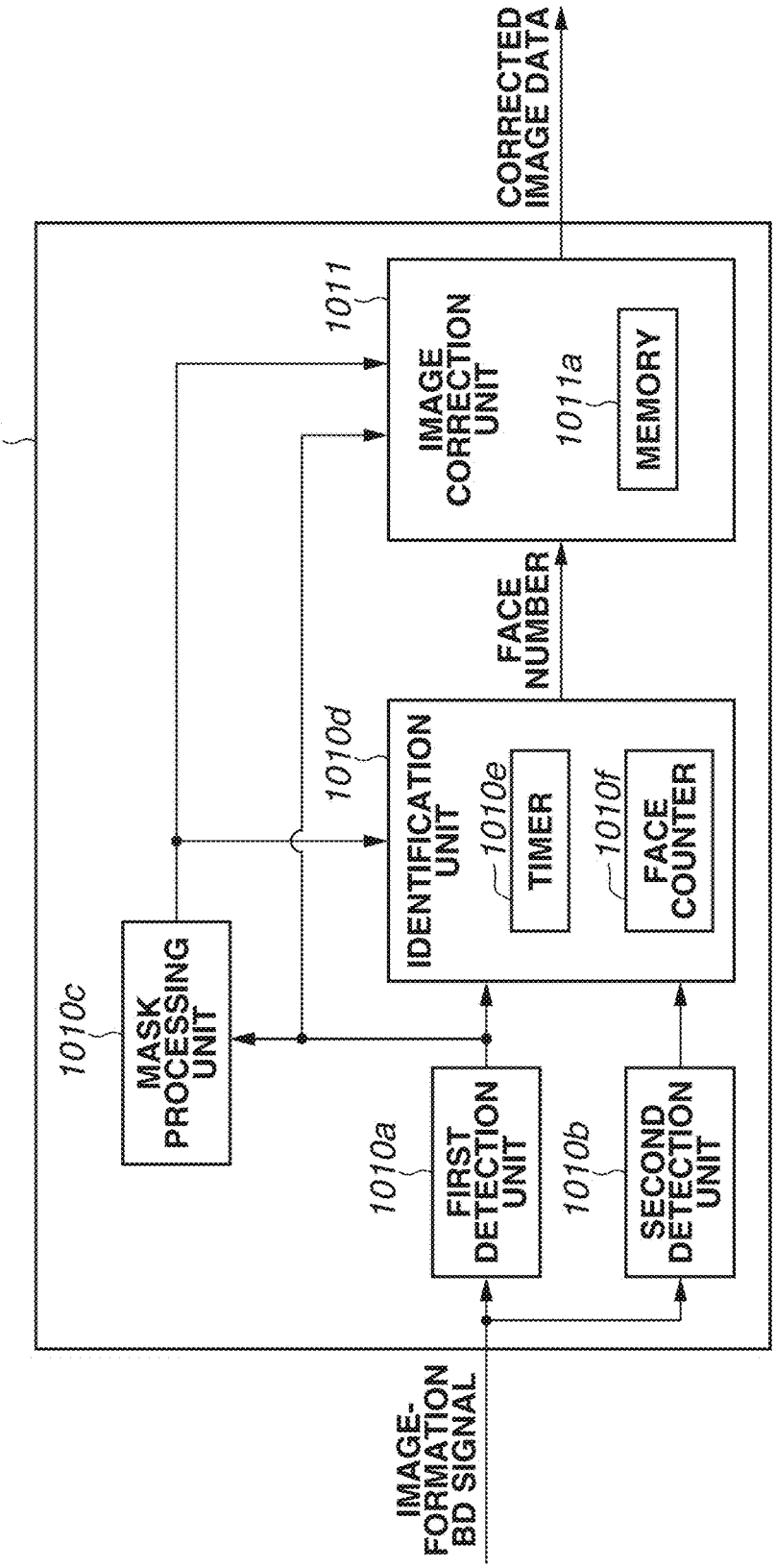

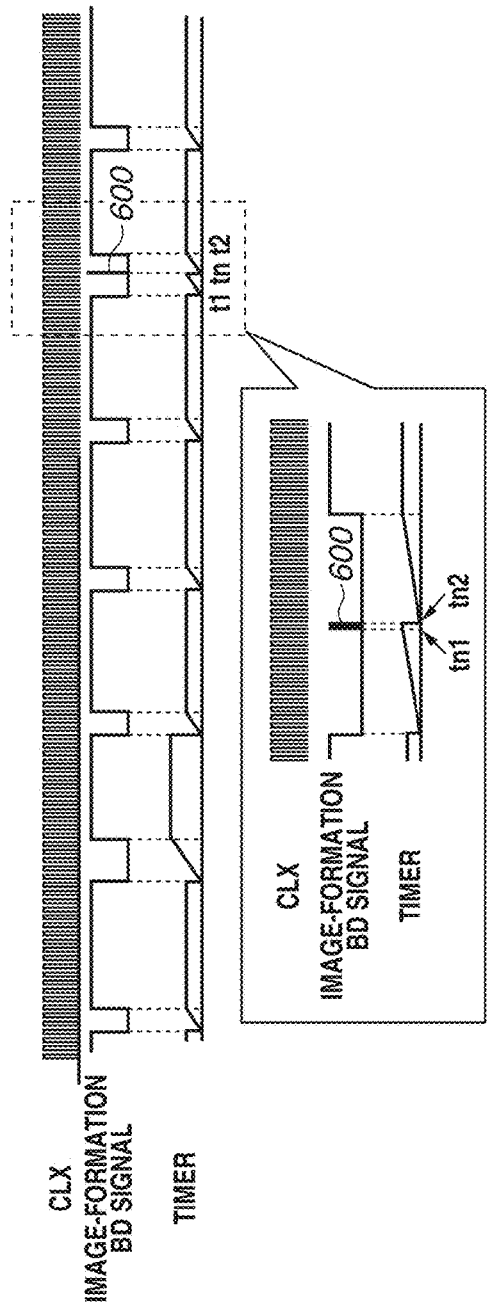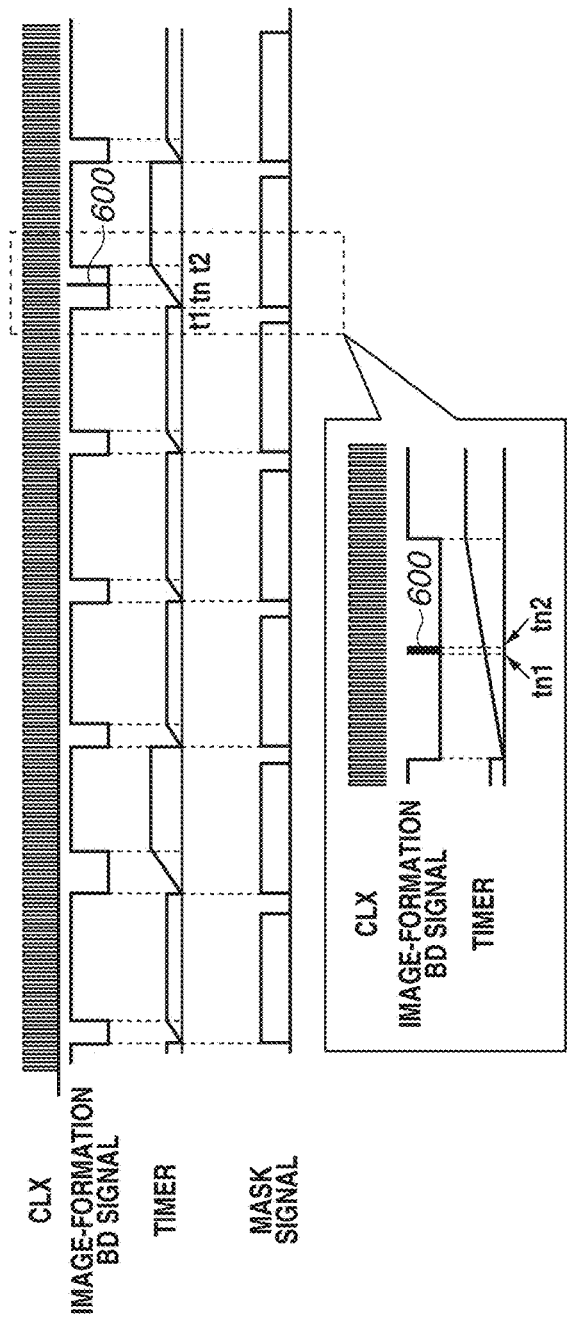

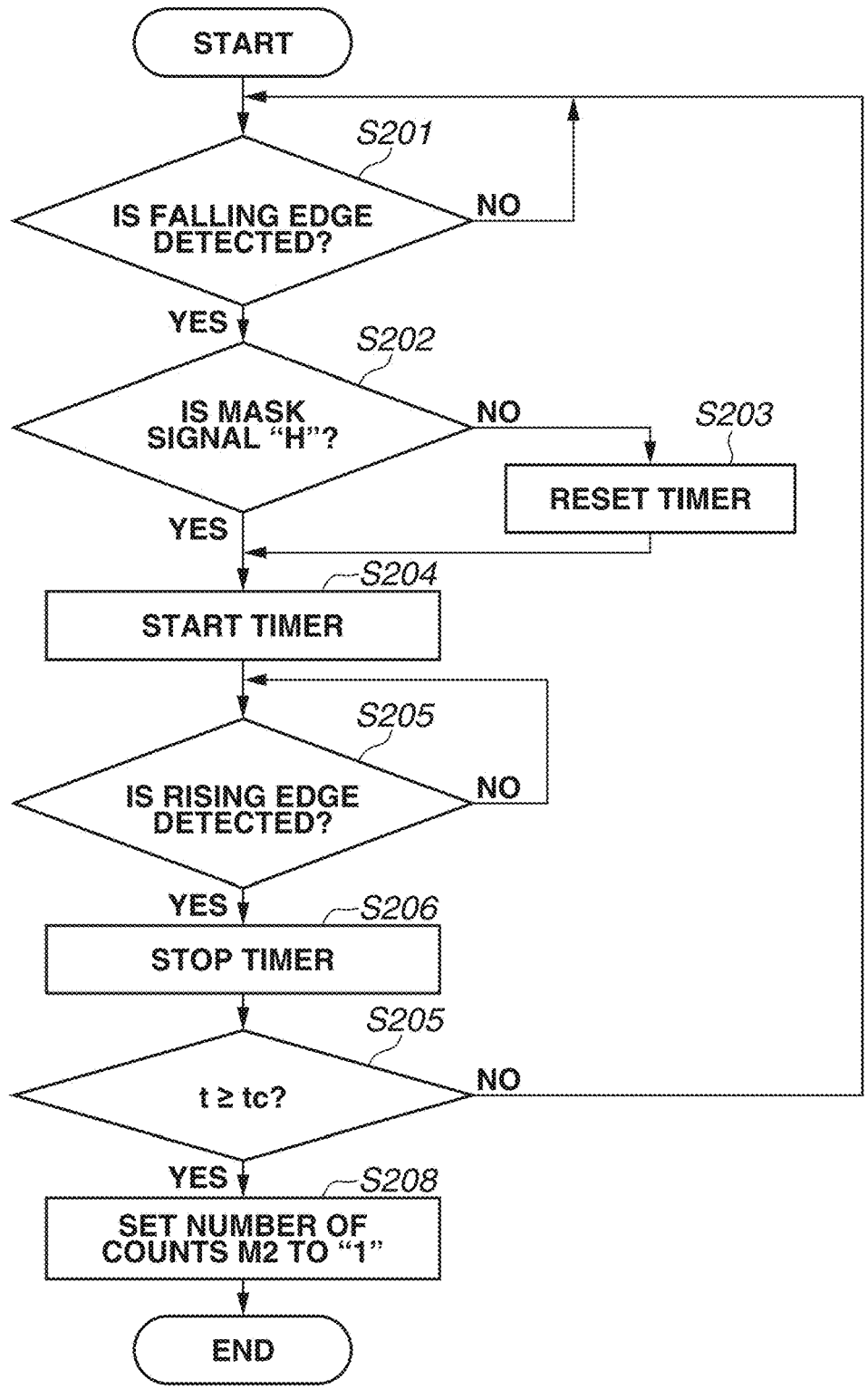

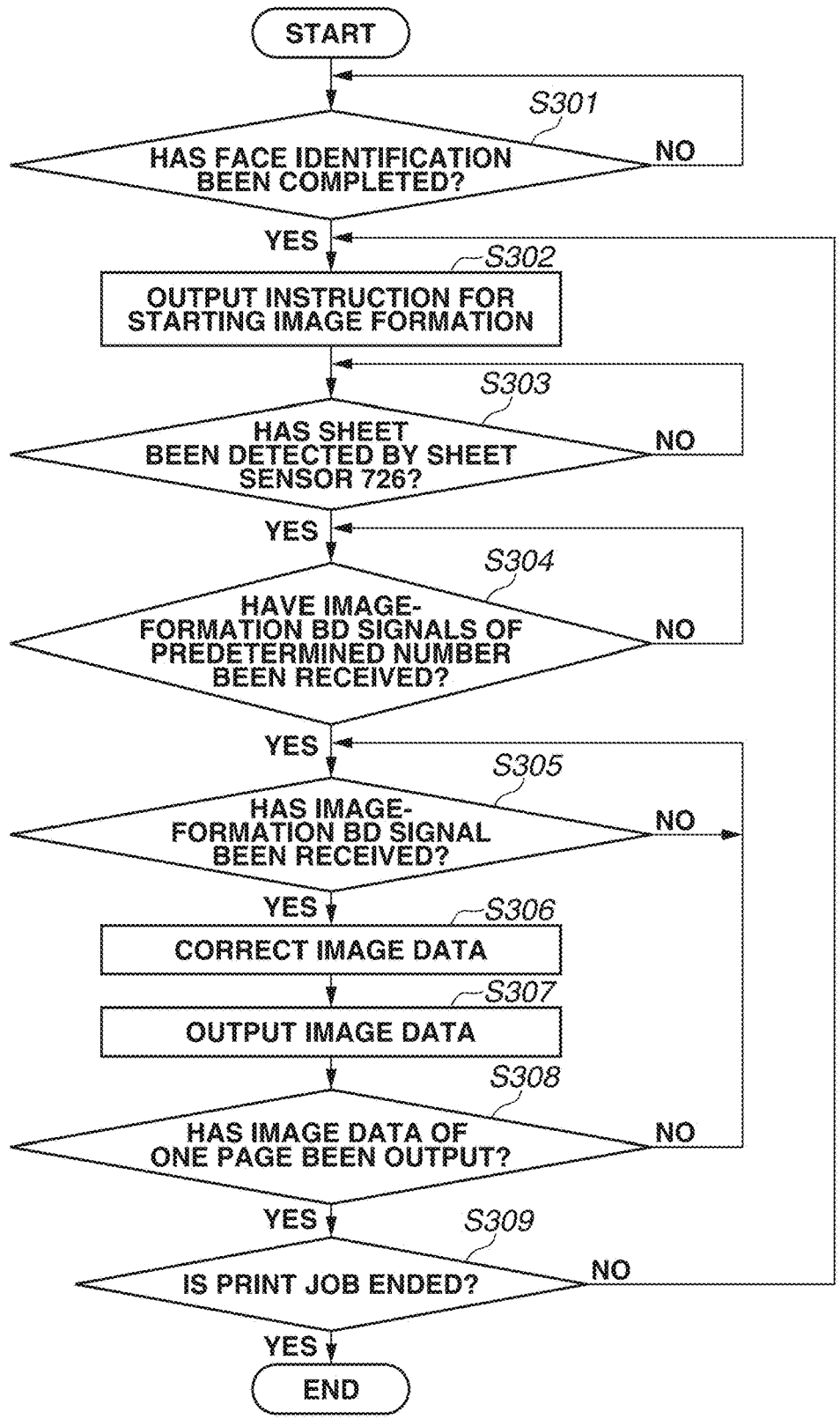

INFORMATION PROCESSING APPARATUS AND IMAGE FORMING APPARATUS

BACKGROUND OF THE INVENTION

Field of the Invention

One disclosed aspect of the embodiments relates to an information processing apparatus that corrects image data and transmits the image data to an image forming apparatus, and an image forming apparatus to which the information processing apparatus is connected.

Description of the Related Art

Conventionally, there has been known an electrophotographic-type image forming apparatus employing laser light for forming a latent image on an outer circumferential surface of a photosensitive drum by scanning the outer circumferential surface of the photosensitive drum with the laser light deflected by a rotating polygon mirror.

Shapes of the faces of the polygon mirror for deflecting laser light are different from each other. If the shapes of the faces are different from each other, latent images formed on the outer circumferential surface of the photosensitive drum with laser light deflected by respective faces will be distorted.

To solve this problem, U.S. Pat. No. 9,575,314 discusses an image controller that executes face identification to identify a polygon mirror face for deflecting laser light based on a time interval between adjacent pulses of a main scanning synchronization signal input thereto. More specifically, the image controller measures a time interval between adjacent pulses, and executes processing for identifying the faces corresponding to the respective pulses based on the measurement result. The image controller executes correction corresponding to the respective faces (e.g., correction of writing-start positions of images) on image data. Image formation is executed based on the corrected image data. In addition, the face identification is executed before an image of the first page is formed.

In the configuration described in U.S. Pat. No. 9,575,314, there is a possibility that the image controller cannot identify the polygon mirror face precisely if noise is mixed into the received main scanning synchronization signal. If the polygon mirror face cannot be identified precisely, correction appropriate for the respective faces will not be executed, and thus the latent image may be formed in a distorted state.

SUMMARY OF THE INVENTION

At least one aspect of the present disclosure is directed to a technique for determining a reflection face with high accuracy. An information processing apparatus is connected with an image forming apparatus including an image forming unit. The image forming unit includes a first receptor, a light source, a photosensitive member, a rotational polygon mirror, a light receiving unit, an identifier, and a generator. The first receptor is configured to receive image data. The light source is configured to output light based on the image data received by the first receptor. The rotational polygon mirror has a plurality of reflection faces, and is configured to be rotated to scan the photosensitive member by deflecting light output from the light source by using the plurality of reflection faces. The light receiving unit includes a light receiving element for receiving the light deflected by the rotational polygon mirror. The identifier is configured to identify a reflection face used for scanning the photosensitive member from among the plurality of reflection faces. The generator is configured to generate a signal including a signal of a first level and a signal of a second level. The generator generates the signal based on information about the reflection face identified by the identifier to cause a period of the first level of the signal corresponding to the identified reflection face to be longer than a period of the first level of the signal corresponding to a reflection face other than the identified reflection face from among the plurality of reflection faces. The information processing apparatus includes a second receptor, a first detector, a second detector, a determiner, a corrector, and an output unit. The second receptor is configured to receive the signal. The first detector is configured to detect a first change in which a level of the signal received by the second receptor is changed from the second level to the first level. The second detector is configured to detect a second change in which a level of the signal received by the second receptor is changed from the first level to the second level. The determiner is configured to determine whether the first change detected at a first timing is a change corresponding to the identified reflection face based on time period from the first timing at which the first change is detected to a timing at which the second change is firstly detected after the first timing. The corrector is configured to correct image data corresponding to a scanning line of the light with correction data corresponding to the reflection face corresponding to the scanning line based on a determination result of the determiner. The output unit is configured to output image data corrected by the corrector to the image forming unit. When the first change is newly detected in a predetermined period starting from the first timing serving as a starting point, based on a time period from a second timing at which the first change is newly detected in the predetermined period to a timing at which the second change is firstly detected after the second timing and a time period from the first timing as the starting point of the predetermined period that includes the second timing to a timing at which the second change is lastly detected before the second timing, the determiner determines whether the first change detected at the first timing as the starting point of the predetermined period is a change corresponding to the identified reflection face. The output unit outputs image data corrected by the corrector to the image forming unit when the first detector detects the first change in a period other than the predetermined period, and does not output the corrected image data even if the first detector detects the first change within the predetermined period.

Further features of the disclosure will become apparent from the following description of exemplary embodiments with reference to the attached drawings.

BRIEF DESCRIPTION OF THE DRAWINGS

FIG. 3 is a block diagram illustrating a configuration of a laser scanner unit according to the first exemplary embodiment.

FIG. 5 is a time chart illustrating a relationship between various signals and a number of counts M1 according to the first exemplary embodiment.

FIG. 6 is a flowchart illustrating control processing executed by an engine control unit according to the first exemplary embodiment.

FIG. 7 is a block diagram illustrating an example of a configuration of an image processing unit.

FIGS. 8A and 8B are time charts illustrating mask signals output from a mask processing unit and counting results of a timer.

FIG. 9 is a flowchart illustrating a method of identifying a reflection face based on an image-formation BD signal output from the engine control unit.

FIG. 10 is a flowchart illustrating control processing executed by an image control unit according to the first exemplary embodiment.

DESCRIPTION OF THE EMBODIMENTS

An exemplary embodiment will be described below with reference to the appended drawings. In addition, shapes or relative positions of constituent elements described in the exemplary embodiment described below should be changed as appropriate according to a configuration or various conditions of an apparatus to which the disclosure is applied, and the scope of the disclosure should not be limited to the exemplary embodiment described below.

<Image Forming Operation>

Figure 1:
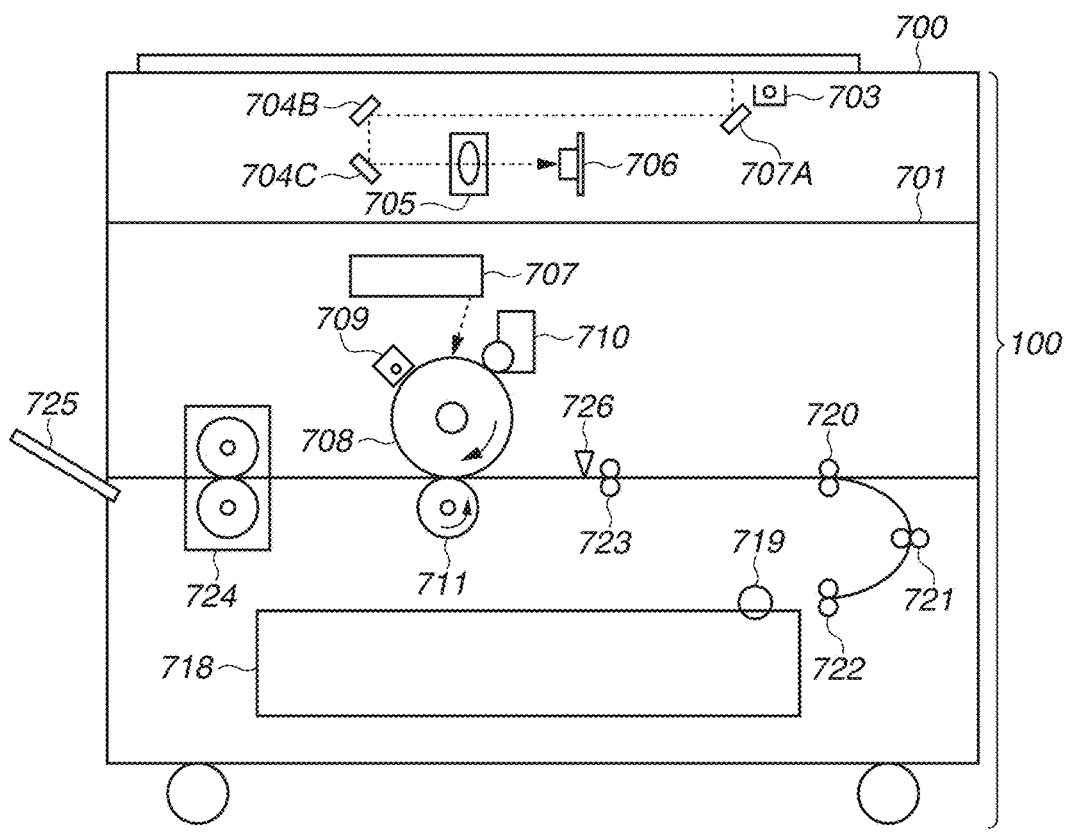
FIG. 1 is a cross-sectional diagram illustrating an image forming apparatus according to a first exemplary embodiment.

FIG. 1 is a cross-sectional diagram illustrating a configuration of an electrophotographic monochrome copying machine (hereinafter, referred to as "image forming apparatus") 100 according to a first exemplary embodiment. In addition, the image forming apparatus 100 is not limited to a copying machine, but may be a facsimile apparatus, a printing apparatus, or a printer. Further, a type of the image forming apparatus 100 may be either a monochrome type or a multi-color type.

A configuration and a function of the image forming apparatus 100 will be described below with reference to FIG. 1. As illustrated in FIG. 1, the image forming apparatus 100 includes an image reading apparatus (hereinafter, referred to as "reader") 700 and an image printing apparatus 701.

Light radiated from an illumination lamp 703 and reflected on a document at a reading position of the reader 700 is guided to a color sensor 706 through an optical system configured of reflection mirrors 704A, 704B, and 704C, and a lens 705. The reader 700 reads light incident on the color sensor 706 at each of colors of blue (hereinafter, referred to as "B"), green (hereinafter, referred to as "G"), and red (hereinafter, referred to as "R"), and converts the light into electric image signals. Further, the reader 700 generates monochrome image data based on the image signals of B, G, and R, and outputs the image data to an image control unit 1007 (see FIG. 3) described below. In this way, the reader 700 reads the document image by using the RGB color sensor 706 to generate the monochrome image data based on the read result in the present exemplary embodiment. Then, based on the monochrome image data, a monochrome image is formed on a recording medium.

A sheet storage tray 718 is arranged inside the image printing apparatus 701. A recording medium stored in the sheet storage tray 718 is fed by a feeding roller 719, and conveyed to a registration roller 723 in a stopped state by conveyance rollers 722, 721, and 720. A leading edge of the recording medium conveyed by the conveyance roller 720 in a conveyance direction abuts on a nip portion of the registration roller 723 in a stopped state. Then, in a state where the leading edge of the recording medium abuts on the nip portion of the registration roller 723 in a stopped state, the recording medium is further conveyed by the conveyance roller 720, so that the recording medium is brought into a curved state. As a result, an elastic force acts on the recording medium, and the leading edge of the recording medium abuts on the registration roller 723 along the nip portion thereof. In this way, skew correction of the recording medium is executed. After skew correction of the recording medium is executed, the registration roller 723 start conveying the recording medium at a timing described below. In addition, the recording medium may be a material such as a paper sheet, a resin sheet, a cloth, an overhead projector (OHP) sheet, or a label, on which an image is formed by the image forming apparatus 100.

Image data acquired by the reader 700 is corrected by the image control unit 1007 and input to a laser scanner unit 707 including a laser device and a polygon mirror. Further, an outer circumferential surface of a photosensitive drum 708 is charged by a charging unit 709. After the outer circumferential surface of the photosensitive drum 708 is charged thereby, the laser scanner unit 707 irradiates the outer circumferential surface of the photosensitive drum 708 with laser light according to the image data input thereto. As a result, an electrostatic latent image is formed on a photosensitive layer (photosensitive member) that covers the outer circumferential surface of the photosensitive drum 708. The configuration of forming an electrostatic latent image on the photosensitive layer with laser light will be described below.

Subsequently, the electrostatic latent image is developed with toner stored in a development unit 710, so that a toner image is formed on the outer circumferential surface of the photosensitive drum 708. The toner image formed on the photosensitive drum 708 is transferred to a recording medium by a transfer charging unit 711 arranged at a position (transfer position) opposing the photosensitive drum 708. The registration roller 723 convey the recording medium to the transfer position while adjusting a conveyance timing at which the toner image can be transferred to a predetermined position of the recording medium.

As described above, the recording medium on which the toner image has been transferred is conveyed to a fixing unit 724, and heated and pressurized with the fixing unit 724, so that the toner image is fixed on the recording medium. The recording medium on which the toner image has been fixed is discharged to a discharge tray 725 arranged outside the image forming apparatus 100.

In this way, an image is formed on the recording medium by the image forming apparatus 100. These are the descriptions about the configuration and the function of the image forming apparatus 100.

<Configuration for Forming Electrostatic Latent Image>

Figure 2:
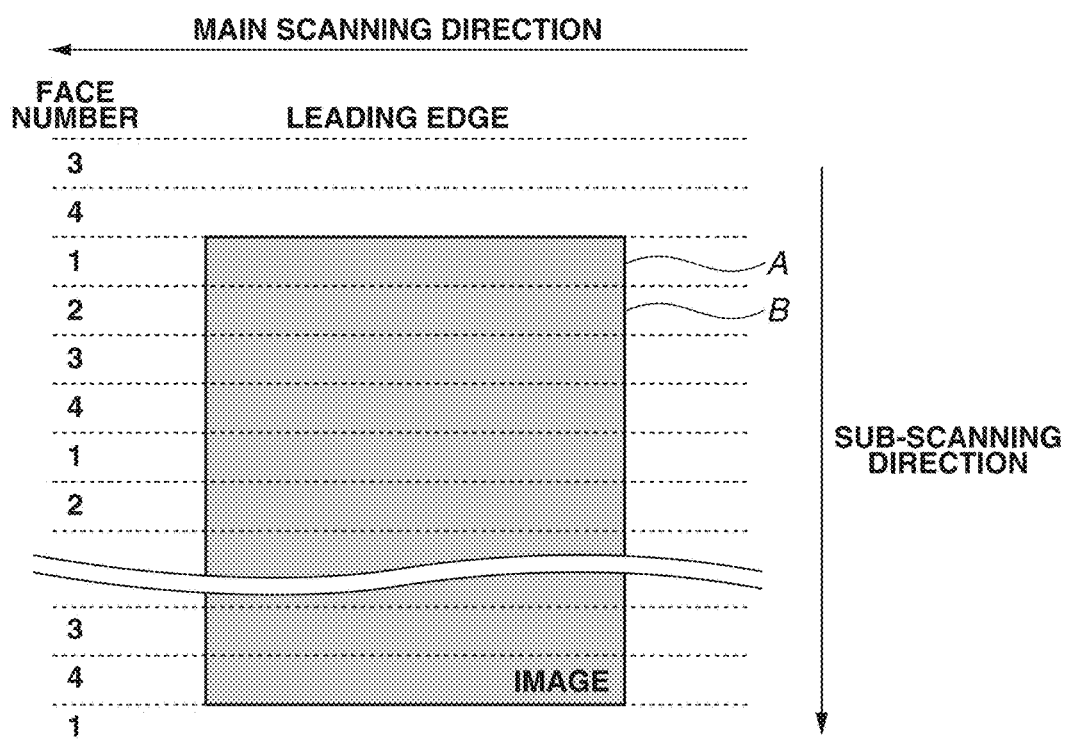
FIG. 2 is a diagram illustrating an example of image data read by a reader.

FIG. 2 is a diagram illustrating an image corresponding to one face of the recording medium. Face numbers in FIG. 2 each indicate a reflection face of the polygon mirror 1002. In the present exemplary embodiment, the polygon mirror 1002 includes four reflection faces.

As illustrated in FIG. 2, by scanning a photosensitive layer with laser light deflected by one reflection face from among the reflection faces of the polygon mirror 1002 in an axis direction (main scanning direction) of the photosensitive drum 708, an image (electrostatic latent image) for one scanning operation (one line) is formed on the photosensitive layer. The scanning operation is repeatedly executed in a rotation direction (sub-scanning direction) of the photosensitive drum 708 with laser light deflected by the respective faces, so that an electrostatic latent image for one face of the recording medium is formed on the photosensitive layer.

In descriptions to be made below, image data corresponding to one line of the electrostatic latent image is called as image data.

<Laser Scanner Unit>

FIG. 3 is a block diagram illustrating a configuration of the laser scanner unit 707 in the present exemplary embodiment. A configuration of the laser scanner unit 707 will be described below. In the present exemplary embodiment, as illustrated in FIG. 3, a substrate A on which an engine control unit 1009 is arranged is a substrate different from a substrate B on which the image control unit 1007 is arranged. Further, the substrate A on which the engine control unit 1009 is arranged is connected to the substrate B on which the image control unit 1007 is arranged with a cable.

As illustrated in FIG. 3, laser light is emitted from both end portions of a laser light source 1000. Laser light emitted from one end portion of the laser light source 1000 is incident on a photodiode (PD) 1003. The PD 1003 converts the incident laser light into an electric signal and outputs an electric signal as a PD signal to a laser control unit 1008. Based on the received PD signal, the laser control unit 1008 controls an amount of light output from the laser light source 1000 to cause the output light amount of the laser light source 1000 to be a predetermined light amount (hereinafter, this control is called as "auto power control (APC)").

On the other hand, laser light emitted from another end portion of the laser light source 1000 is radiated to the polygon mirror 1002 serving as a rotational polygon mirror via a collimator lens 1001.

The polygon mirror 1002 is rotationally driven by a polygon motor (not illustrated). The polygon motor is controlled by a driving signal Acc/Dec output from the engine control unit 1009.

The laser light radiated to the rotating polygon mirror 1002 is deflected by the polygon mirror 1002. The outer circumferential surface of the photosensitive drum 708 is scanned with the laser light deflected by the polygon mirror 1002 in a direction from the right to left in FIG. 3.

The laser light used to scan the outer circumferential surface of the photosensitive drum 708 is corrected by an F-θ lens 1005 to scan the outer circumferential surface of the photosensitive drum 708 at a constant speed. Then, the laser light is radiated to the outer circumferential surface of the photosensitive drum 708 via a reflecting mirror 1006.

Further, the laser light deflected by the polygon mirror 1002 is incident on a beam detect (BD) sensor 1004 serving as a light receiving unit including a light receiving element for receiving the laser light. In the present exemplary embodiment, the BD sensor 1004 is arranged at a position at which the laser light is radiated onto the outer circumferential surface of the photosensitive drum 708 after being detected by the BD sensor 1004 in a period from when the laser light is detected by the BD sensor 1004 once to the laser light is detected by the BD sensor 1004 again. More specifically, for example, as illustrated in FIG. 3, from among regions where laser light reflected on the polygon mirror 1002 passes through, the BD sensor 1004 is arranged in a region outside a region expressed by an angle α and on an upstream side in a scanning direction of laser light.

The BD sensor 1004 generates a BD signal based on the detected laser light and output the BD signal to the engine control unit 1009. Based on the received BD signal, the engine control unit 1009 controls the polygon motor to rotate the polygon mirror 1002 at a predetermined period. When a period of the BD signal becomes a period corresponding to the predetermined period, the engine control unit 1009 determines that the rotation period of the polygon mirror 1002 has become the predetermined period.

The engine control unit 1009 outputs an image-formation BD signal to the image control unit 1007 following the received BD signal. The image-formation BD signal is synchronized with the BD signal, and generated by a generation unit 1009d through a method described below. The image-formation BD signal corresponds to a signal indicating one-scanning period for scanning the photosensitive drum 708 with laser light.

The image control unit 1007 includes an image processing unit 1010, a receiving unit 1013, a communication interface (I/F) 1012, and a central processing unit (CPU) 151. The image processing unit 1010 outputs corrected image data to the laser control unit 1008 following the image-formation BD signal input to the receiving unit 1013. A specific configuration of control processing executed by the engine control unit 1009 or the image control unit 1007 will be described below.

The laser control unit 1008 turns on the laser light source 1000 based on the received image data to generate laser light for forming an image on the outer circumferential surface of the photosensitive drum 708. As described above, the laser control unit 1008 is controlled by the image control unit 1007 serving as an information processing apparatus. The generated laser light is radiated onto the outer circumferential surface of the photosensitive drum 708 through the above-described method.

In addition, a distance L, between a detection position the recording medium by the sheet sensor 726 and a transfer position, is longer than a distance x between a position on the outer circumferential surface of the photosensitive drum 708 irradiated with laser light and the transfer position in the rotation direction of the photosensitive drum 708. More specifically, the distance L is a sum of a distance x and a conveyance distance of the recording medium in a period from when the leading edge of the recording medium is detected by the sheet sensor 726 to when laser light is emitted from the laser light source 1000. Further, in a period from when the leading edge of the recording medium is detected by the sheet sensor 726 to when laser light is emitted from the laser light source 1000, the image control unit 1007 corrects the image data and controls the laser control unit 1008.

These are the descriptions about the configuration of the laser scanner unit 707.

<Method of Identifying Face of Polygon Mirror>

The image control unit 1007 outputs the corrected image data to the laser control unit 1008 in an order from the most upstream image data in the sub-scanning direction based on the period of the received image-formation BD signal. The laser control unit 1008 controls the laser light source 1000 based on the received image data to form an image on the outer circumferential surface of the photosensitive drum 708. In the present exemplary embodiment, the polygon mirror 1002 includes four faces. However, the number of faces of the polygon mirror 1002 is not limited to 4.

An image is formed on a recording medium with laser light deflected by a plurality of reflection faces of the polygon mirror 1002. More specifically, for example, as illustrated in FIG. 2, an image corresponding to image data on the most upstream side in the sub-scanning direction is formed by the laser light deflected by the first face of the polygon mirror 1002. Further, an image corresponding to image data on the second-most upstream side in the sub-scanning direction is formed by the laser light deflected by the second face different from the first face of the polygon mirror 1002. In this way, an image formed on the recording medium consists of images formed by the laser light reflected on different reflection faces of the plurality of reflection faces of the polygon mirror 1002.

If a polygon mirror including four reflection faces is to be used as the polygon mirror 1002 for deflecting laser light, an angle between two adjacent reflection faces of the polygon mirror 1002 may not be exactly 90-degree. More specifically, when the polygon mirror having four reflection faces is viewed in the rotation axis direction, an angle between two adjacent sides may not be exactly 90-degree (i.e., a shape of the polygon mirror viewed in the rotation axis direction may not be a square shape). In addition, in a case where a polygon mirror having n reflection faces is used ("n" is a positive integer), a shape of the polygon mirror viewed in the rotation axis direction may not be an equilateral n shapes.

When a polygon mirror including four reflection faces is used, a position and/or a size of an image formed by laser light will be different based on each reflection face if an angle between two adjacent reflection faces of the polygon mirror is not exactly 90 degrees. As a result, distortion occurs in an image formed on the outer circumferential surface of the photosensitive drum 708, so that distortion also occurs in the image formed on the recording medium.

Thus, in the present exemplary embodiment, correction (e.g., correction of writing-start position) is executed on the image data by a correction amount (correction data) corresponding to each of the reflection faces of the polygon mirror 1002. In this case, a face that deflects the laser light has to be identified. An example of a method for identifying a face that deflects laser light will be described below. In the present exemplary embodiment, a face that deflects (reflects) laser light is identified from the plurality of reflection faces of the polygon mirror 1002 by a face identification unit 1009a included in the engine control unit 1009.

Figure 4A:
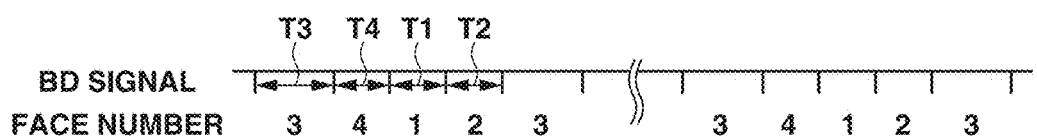
FIGS. 4A and 4B are diagrams illustrating examples of a relationship between a beam-detect (BD) signal generated by scanning a light-receiving element of a BD sensor with laser light and a face that deflects the laser light (face number).

FIG. 4A is a diagram illustrating an example of a relationship between the BD signal generated by scanning a light receiving face of the BD sensor 1004 with laser light and a face that deflects the laser light (face number). As illustrated in FIG. 4A, time (scanning period) from when a pulse of the BD signal falls down to when the BD signal firstly falls down after the timing at which the BD signal falls down, is different at each of the faces of the polygon mirror 1002. In addition, the scanning period corresponds to a time period from when the light receiving face of the BD sensor 1004 is scanned with laser light to another timing at which the light receiving face is firstly scanned with laser light again after the timing at which the light receiving face is scanned with laser light.

In FIG. 4A, periods corresponding to face numbers 1, 2, 3, and 4 are expressed as "T1", "T2", "T3", and "T4", respectively. Further, the respective periods T1 to T4 are stored in a memory 1009c provided in the face identification unit 1009a.

Figure 4B:
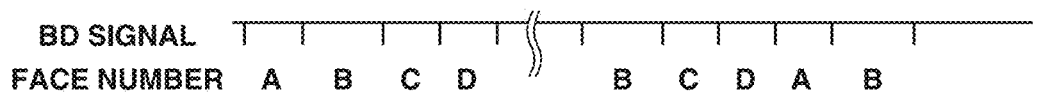

The face identification unit 1009a identifies a face that deflects the laser light (face number), through a method described below. Specifically, as illustrated in FIG. 4B, the face identification unit 1009a sets face numbers A to D with respect to four consecutive scanning period of the BD signal.

Then, the face identification unit 1009a measures the scanning period of each of the face numbers A to D for a plurality of times (e.g., 32 times), and calculates an average value of the measured periods with respect to each of the face numbers A to D.

Based on the calculated periods and the periods T1 to T4 stored in the memory 1009c, the engine control unit 1009 identifies a face number from among the face numbers A to D that corresponds to each of the face numbers 1 to 4.

As described above, based on the received BD signal, the face identification unit 1009a identifies the face number of the face that deflects the laser light (i.e., a reflection face used for scanning the photosensitive drum 708 from among the plurality of reflection faces of the polygon mirror 1002).

<Engine Control Unit>

Next, control processing executed by the engine control unit 1009 according to the present exemplary embodiment will be described with reference to FIGS. 3 and 5.

As illustrated in FIG. 3, the face identification unit 1009a includes a face counter 1009b for storing face information indicating a reflection face that deflects laser light for scanning the light receiving face of the BD sensor 1004 from among the plurality of reflection faces.

FIG. 5 is a time chart illustrating a relationship between various signals and the number of counts M1 of the face counter 1009b. In addition, the number of counts M1 of the face counter 1009b corresponds to face information.

When the rotation period of the polygon mirror 1002 has become a predetermined period (time t1), the engine control unit 1009 (face identification unit 1009a) executes identification of the face number (i.e., determination of the face) through the above-described method based on the received BD signal.

The engine control unit 1009 starts counting by the face counter 1009b from time t2 when the face identification unit 1009a ends identification (estimation) of the face number. More specifically, when identification of the face number has been completed, the engine control unit 1009 sets a face number corresponding to a BD signal firstly received after completion of the face number identification as an initial value of the number of counts M1 of the face counter 1009b. After setting the initial value of the number of counts M1, the engine control unit 1009 updates the number of counts M1 each time the falling edge of the received BD signal is detected. In addition, in a case where the polygon mirror 1002 includes n reflection faces ("n" is a positive integer), "M1" is a positive integer that satisfies a condition "1≤M1≤n".

Thereafter, when completion of face determination is notified to the image control unit 1007 from the engine control unit 1009 via a communication interface (I/F) 1009e, the CPU 151 outputs an instruction for executing printing (forming an image on a recording medium) to the engine control unit 1009 via the communication I/F 1012 at a timing A. As a result, the engine control unit 1009 starts driving the registration roller 723. As a result, a leading edge of the recording medium is detected by the sheet sensor 726 at a timing B. In addition, the timing A is determined by the CPU 151 based on a processing time of a print job input to the image forming apparatus 100. In other words, the timing A is not limited to the timing illustrated in FIG. 5. Further, in the present exemplary embodiment, as illustrated in FIG. 5, a timing at which a signal indicating a detection result becomes a low level corresponds to a timing at which the sheet sensor 726 detects the leading edge of the recording medium.

When the face determination has been completed, the generation unit 1009d generates an image-formation BD signal based on the face information identified by the face identification unit 1009a and the BD signal output from the BD sensor 1004. More specifically, the generation unit 1009d sets the time when the image-formation BD signal indicating the identified reflection face (in the present exemplary embodiment, "face 1") is a low level ("L") to time different from the time when the image-formation BD signal indicating another reflection face is "L". More specifically, as illustrated in FIG. 5, the time when the image-formation BD signal corresponding to the face number 1 is "L" is set to time different from the time when the image-formation BD signal corresponding to another face number 2, 3, or 4 is "L". In the present exemplary embodiment, time to when the image-formation BD signal corresponding to the face number 1 is "L" is set to be longer than time tb when the image-formation BD signal corresponding to another face number 2, 3, or 4 is "L".

The engine control unit 1009 outputs a signal generated by the generation unit 1009d as the image-formation BD signal following (in synchronization with) the BD signal output from the BD sensor 1004.

The engine control unit 1009 includes a pulse counter 1009f for counting the number of pulses of the output image-formation BD signal. Further, as illustrated in FIG. 3, a detection result of the sheet sensor 726 is input to the engine control unit 1009. The sheet sensor 726 is arranged on the downstream side of the registration roller 723, and detects arrival of the leading edge of the recording medium. When the engine control unit 1009 receives a signal indicating that the sheet sensor 726 has detected the leading end of the recording medium from the sheet sensor 726, the engine control unit 1009, by using the counter 1009f, starts counting the number of pulses of the output image-formation BD signal. If the number of counted pulses has reached the number of pulses corresponding to one page of the recording medium (period Ta), the engine control unit 1009 stops driving the registration roller 723.

FIG. 6 is a flowchart illustrating control processing executed by the engine control unit 1009 according to the present exemplary embodiment. The processing of the flowchart in FIG. 6 is executed by the engine control unit 1009. Further, in the below-described exemplary embodiment, after the face identification has been completed, the engine control unit 1009 updates the number of counts M1 every time the falling edge of the received BD signal is detected.

When a print job is started, then in step S101, the engine control unit 1009 starts driving a motor (polygon motor) for rotationally driving the polygon mirror 1002.

In step S102, when a rotation period of the polygon mirror 1002 has become a predetermined period (YES in step S102), the processing proceeds to step S103. In step S103, the engine control unit 1009 starts face identification at time t1.

Then, in step S104, when the engine control unit 1009 has completed the face identification at time t2 (YES in step S104), the processing proceeds to step S105.

Thereafter, in step S105, the engine control unit 1009 sets a face number corresponding to a BD signal firstly received after ending identification of the face number as the initial value of the number of counts M1 of the face counter 1009b. After setting the initial value, the engine control unit 1009 updates the number of counts M1 every time the falling edge of the received BD signal is detected.

Next, in step S106, the engine control unit 1009 notifies the image control unit 1007 of completion of the face identification via the communication I/F 1009e.

Then, in step S107, the engine control unit 1009 starts outputting the image-formation BD signal.

In step S108, if the engine control unit 1009 receives an instruction for forming an image on a recording medium from the CPU 151 (YES in step S108), the processing proceeds to step S109. In step S109, the engine control unit 1009 starts driving the registration roller 723. As a result, conveyance of the recording medium is started.

Thereafter, in step S110, when the engine control unit 1009 receives a signal indicating that the leading edge of the recording medium has been detected by the sheet sensor 726 (YES in step S110), the processing proceeds to step S111. In step S111, the engine control unit 1009 starts counting the pulses of the output image-formation BD signal. In addition, for example, the engine control unit 1009 counts falling edges of the pulses of the output image-formation BD signal.

In step S112, when the number of counted pulses has reached the number of pulses corresponding to one page of the recording medium (period Ta) (YES in step S112), the processing proceeds to step S113. In step S113, the engine control unit 1009 ends the counting of the pulses of the output image-formation BD signal. In step S114, the engine control unit 1009 resets the number of counts.

Further, in step S115, the engine control unit 1009 stops driving the registration roller 723.

In step S116, if any print job has not been ended (NO in step S116), the processing returns to step S108 again.

Further, in step S116, if the print job is ended (YES in step S116), the processing proceeds to step S117. In step S117, the engine control unit 1009 stops outputting the image-formation BD signal. Then, in step S118, the engine control unit 1009 stops driving the polygon mirror 1002 and ends the processing of this flowchart.

These are the control processing executed by the engine control unit 1009.

<Image Control Unit>
<Face Identification Method executed by Image Processing Unit>

Next, control processing executed by the image control unit 1007 will be described. As illustrated in FIG. 3, the image control unit 1007 includes an image processing unit 1010. The image processing unit 1010 identifies face information indicating a reflection face that deflects laser light for scanning a light receiving face of the BD sensor 1004 from among the plurality of reflection faces, and corrects the image data based on the face information. Hereinafter, a function of the image processing unit 1010 will be described.

FIG. 7 is a block diagram illustrating an example of a configuration of the image processing unit 1010. As illustrated in FIG. 7, the image processing unit 1010 includes a first detection unit 1010a for detecting a falling edge as a first change of the received image-formation BD signal and a second detection unit 1010b for detecting a rising edge as a second change of the received image-formation BD signal. Further, the image processing unit 1010 includes a mask processing unit 1010c for outputting a mask signal based on a detection result output from the first detection unit 1010a. The image processing unit 1010 further includes an identification unit 1010d for identifying a reflection face that deflects laser light for scanning the light receiving face of the BD sensor 1004 from among the plurality of reflection faces. The image processing unit 1010 further includes an image correction unit 1011 for correcting the image data based on the information about the reflection face identified by the identification unit 1010d.

The first detection unit 1010a detects a falling edge of the received image-formation BD signal and outputs a signal indicating the detection of the falling edge to the mask processing unit 1010c, the identification unit 1010d, and the image correction unit 1011.

Further, the second detection unit 1010b detects a rising edge of the received image-formation BD signal and outputs a signal indicating the detection of the rising edge to the identification unit 1010d.

The identification unit 1010d includes a timer 1010e and a face counter 1010f. The timer 1010e counts the time during which the image-formation BD signal is "L" based on the detection results acquired by the first detection unit 1010a and the second detection unit 1010b. The face counter 1010f stores the face information indicating the identified reflection face. The number of counts M2 of the face counter 1010f corresponds to face information.

The identification unit 1010d resets the timer 1010e when the first detection unit 1010a outputs a signal indicating the detection of a falling edge. Further, the identification unit 1010d stops the timer 1010e when the second detection unit 1010b outputs a signal indicating the detection of a rising edge.

The identification unit 1010d identifies a reflection face based on the counting result of the timer 1010e. Specifically, when the time t counted by the timer 1010e is greater than the predetermined time tc, the identification unit 1010d determines that the image-formation BD signal input to the image control unit 1007 is a signal indicating the face number "1". The predetermined time tc is set to be shorter than the time to when the image-formation BD signal corresponding to the face number "1" is "L", and longer than the time when the image-formation BD signal corresponding to another face number "2", "3", or "4" is "L".

When determining that the image-formation BD signal input to the image control unit 1007 is a signal indicating the face number "1", the identification unit 1010d sets the number of counts M2 of the face counter 1010f to "1".

The identification unit 1010d updates the number of counts M2 of the face counter 1010f every time the signal indicating detection of the falling edge is output from the first detection unit 1010a. The number of counts M2 of the face counter 1010f is output to the image correction unit 1011 as the face number. In addition, in a case where the polygon mirror 1002 includes n-pieces of reflection faces ("n" is a positive integer), "M2" is a positive integer that satisfies a condition "1≤M2≤n".

The image correction unit 1011 outputs corrected image data when the signal indicating detection of the falling edge is output from the first detection unit 1010a. In addition, a correction method of image data executed by the image correction unit 1011 will be described below.

FIGS. 8A and 8B are time charts illustrating counting results of the timer 1010e. FIG. 8A is a time chart illustrating a counting result of the timer 1010e when a mask signal is not output from the mask processing unit 1010c. FIG. 8B is a time chart illustrating a counting result of the timer 1010e when a mask signal is output from the mask processing unit 1010c. As illustrated in FIGS. 8A and 8B, the timer 1010e counts time based on a clock (CLK) signal.

As illustrated in FIG. 8A, if noise 600 is generated in a period (time tn) during which the image-formation BD signal is "L", a rising edge and a falling edge appears in the image-formation BD signal caused by the noise 600. The identification unit 1010d resets the timer 1010e when the first detection unit 1010a detects the falling edge caused by the noise 600.

For example, if time period from the time t1 to the time tn1 when the rising edge caused by the noise 600 is detected is shorter than the predetermined time tc, the identification unit 1010d erroneously determines that the signal as a counting target is a signal indicating a face other than the face "1". Then, the timer 1010e is reset because of the falling edge caused by the noise 600, so that time period from the time tn2 when the falling edge caused by the noise 600 is detected to the time t2 is counted. If the counted time is shorter than the predetermined time tc, the identification unit 1010d erroneously determines that the signal as a counting target is a signal indicating a face other than the face "1". In this way, if the timer 1010e is reset because of the falling edge caused by the noise 600, the identification unit 1010d erroneously determines that the time period during which the counting target signal is "L" is shorter than the predetermined time tc even if the time period during which the signal as a counting target is "L" is actually longer than the predetermined time tc. In other words, the signal as a counting target is determined to be a signal indicating another face even if the signal as a counting target indicates the face "1". If the above-described erroneous determination is executed, correction of image data may not be executed appropriately.

To improve this issue, in the present exemplary embodiment, by employing the below-described configuration, a reflection face can be determined with high precision.

In the present exemplary embodiment, when the signal indicating detection of a falling edge is output from the first detection unit 1010a, the mask processing unit 1010c sets a mask signal to "high level (H)", and outputs the mask signal to the identification unit 1010d and the image correction unit 1011. In other words, the mask processing unit 1010c sets the mask signal to "H", and outputs the mask signal by setting the timing at which the signal indicating the detection of the falling edge is output from the first detection unit 1010a as a starting point. In the present exemplary embodiment, the time period during which the mask signal is "H" is set to be a time period equivalent to 95% of the shortest scanning period from among the scanning periods T1 to T4 corresponding to the respective face numbers. Further, in the present exemplary embodiment, as illustrated in FIG. 8B, although a mask signal becomes "H" when a falling edge caused by reception of laser light by the BD sensor 1004 is detected, it is not limited thereto. For example, the mask signal may be "H" for predetermined time period within a period from a timing at which a falling edge caused by a reception of laser light by the BD sensor 1004 is detected to a next timing at which a falling edge caused by the reception of laser light by the BD sensor 1004 is firstly detected after the previous timing.

While the mask signal is "H", the identification unit 1010d does not update the number of counts M2 of the face counter 1010f even if a signal indicating the detection of the falling edge is output from the first detection unit 1010a. As a result, it is possible to prohibit the number of counts M2 from being different from the reflection face that deflects the laser light even in a case where the noise is generated in a period from the detection of a falling edge to the detection of next falling edge.

Further, while the mask signal is "H", the image correction unit 1011 does not output image data even if a signal indicating the detection of the falling edge is output from the first detection unit 1010a. As a result, it is possible to prohibit image data from being output when the image-formation BD signal falls down caused by the noise.

Further, in the present exemplary embodiment, the identification unit 1011d controls the timer 1010e as follows while the mask signal is "H". Specifically, as illustrated in FIG. 8B, when the signal indicating the detection of the rising edge is output from the second detection unit 1010b, the identification unit 1011d temporarily stops the counting of time executed by the timer 1010e. Then, in a case where the mask signal is "H" when the signal indicating the detection of the falling edge is output from the first detection unit 1010a, the identification unit 1011d restarts counting time without resetting the timer 1010e.

The identification unit 1010d identifies a reflection face based on time period elapsing from a timing at which the timer 1010e is reset to a next timing at which the timer 1010e is firstly reset after the previous reset timing.

Through the above-described configuration, when a reflection face is to be identified based on time period during which the image-formation BD signal is "L", it is possible to prevent the erroneous identification of a face number caused by the noise.

FIG. 9 is a flowchart illustrating processing of identifying a reflection face based on the image-formation BD signal output from the engine control unit 1009 executed by the identification unit 1010d. The processing of the flowchart in FIG. 9 is executed by the CPU 151. While the processing of this flowchart is being executed, the mask processing unit 1010c sets the mask signal to "H" when the falling edge is detected in a state where the mask signal is in a low level (L).

In step S201, when a signal indicating the detection of a falling edge is output from the first detection unit 1010a (YES in step S201), the processing proceeds to step S202.

In step S202, if the mask signal is "H" (YES in step S202), the processing proceeds to step S204.

On the other hand, in step S202, if the mask signal is "L" (NO in step S202), the processing proceeds to step S203. In step S203, the CPU 151 controls the identification unit 1010d to reset the time counted by the timer 1010e. As a result, the time counted by the timer 1010e is reset. Further, if the mask signal is "L" in step S202, the mask processing unit 1010c sets the mask signal to "H".

Thereafter, in step S204, the CPU 151 controls the identification unit 1010d to start counting time by the timer 1010e. As a result, counting of time by the timer 1010e starts.

In step S205, if a signal indicating the detection of a rising edge is output from the second detection unit 1010b (YES in step S205), the processing proceeds to step S206. In step S206, the CPU 151 controls the identification unit 1010d to stop counting time executed by the timer 1010e. As a result, counting of time executed by the timer 1010e stops.

Then, in step S207, if the counted time t counted by the timer 1010e is shorter than the predetermined time tc (NO in step S207), the processing returns to step S201.

Further, if the counted time t counted by the timer 1010e is the predetermined time tc or longer (YES in step S207), the processing proceeds to step S208. In step S208, the CPU 151 controls the identification unit 1010d to set the number of counts M2 of the face counter 1010f to "1". As a result, the number of counts M2 of the face counter 1010f is set to "1".

Then, the CPU 151 ends the processing of this flowchart.
<Output Timing of Image Data>

The image processing unit 1010 outputs corrected image data based on the image-formation BD signal input to the image control unit 1007 from the engine control unit 1009. More specifically, when y-pieces (in the present exemplary embodiment, 10 pieces) of image-formation BD signals are input thereto after the signal indicating the detection of the leading edge of the recording medium is output from the sheet sensor 726 (i.e., from the 11th pulse), the image processing unit 1010 starts outputting the corrected image data.

As described above, in the present exemplary embodiment, output of the corrected image data is started when the image-formation BD signal of 10 pulses is output after the sheet sensor 726 has detected the leading edge of the recording medium. As a result, an image is formed at a predetermined position of the recording medium.
<Correction of Image Data>

The image correction unit 1011 serving as a correction means sequentially corrects image data from image data A on the most upstream side in the sub-scanning direction, from among a plurality of pieces of image data constituting the image corresponding to one page described in FIG. 2. More specifically, for example, when an image corresponding to the image data A is formed by laser light deflected by a reflection face corresponding to the face number 1, the image correction unit 1011 executes correction corresponding to the face number 1 on the image data A. More specifically, the image correction unit 1011 reads out correction data corresponding to the face number 1 from the memory 1011a. Then, the image correction unit 1011 corrects the image data A based on the read correction data. Thereafter, from among the plurality of pieces of image data on the downstream side of the image data A in the sub-scanning direction, the image correction unit 1011 corrects the image data B on the second-most upstream side based on the correction data corresponding to the face number 2 stored in the memory 1011a. As described above, pieces of correction data corresponding to respective face numbers are stored in the memory 1011a in association with the face numbers.

Through the above-described configuration, laser light generated based on image data corrected by the correction data corresponding to a face number "m" ("m" is an integer from 1 to 4) is deflected by a reflection face corresponding to the face number "m".

The image correction unit 1011 executes the above-described processing until correction of the image data corresponding to one face of the recording medium is completed.

The image correction unit 1011 sequentially outputs the image data corrected for each of the regions as described above from the image data on the upstream side (i.e., image data A) to the laser control unit 1008 for each region. The image correction unit 1011 outputs a piece of image data to the laser control unit 1008 every time the falling edge of the image-formation BD signal is detected (i.e., based on the period of the image-formation BD signal). Further, in the present exemplary embodiment, although the image correction unit 1011 corrects image data and outputs the corrected image data in synchronization with the image-formation BD signal, it is not limited thereto. For example, the image correction unit 1011 may previously correct image data based on the number of counts M2 and output the previously corrected image data to the laser control unit 1008 in synchronization with the image-formation BD signal.

A counter (not illustrated) for counting the number of pieces of output image data is included in the image correction unit 1011, and output of image data is stopped when the number of pieces of image data counted by the counter has reached the number of pieces of image data corresponding to one page of the recording medium.

FIG. 10 is a flowchart illustrating control processing executed by the image control unit 1007. The processing in the flowchart illustrated in FIG. 10 is executed by the CPU 151. In the following description, the face number output to the image correction unit 1011 from the face counter 1010f is updated every time the number of counts M2 is updated. Further, the image control unit 1007 (image correction unit 1011) counts the number of regions of the output image data while the processing of the flowchart in FIG. 10 is being executed.

In step S301, when completion of the face identification is notified by the engine control unit 1009 via the communication I/F 1012 (YES in step S301), the processing proceeds to step S302. In step S302, the CPU 151 outputs an instruction for executing image forming processing on the recording medium to the engine control unit 1009. As a result, the engine control unit 1009 starts driving the registration roller 723.

Then, in step S303, when the image control unit 1007 receives a signal indicating that the sheet sensor 726 has detected the leading edge of the recording medium (YES in step S303), the processing proceeds to step S304.

In step S304, when a predetermined number of image-formation BD signals (in the present exemplary embodiment, 10 pieces) are received, i.e., when a falling edge of the image-formation BD signal is detected for a predetermined number of times (YES in step S304), the processing proceeds to step S305.

In step S305, when the next image-formation BD signal (in the present exemplary embodiment, the 11-th image-formation BD signal) is received (YES in step S305), the processing proceeds to step S306. In step S306, the CPU 151 controls the image correction unit 1011 to correct the image data based on the face number indicated by the number of counts M2. As a result, the image correction unit 1011 corrects the image data based on the face number indicated by the number of counts M2.

Then, in step S307, the CPU 151 controls the image correction unit 1011 to output the image data corrected in step S306 to the laser control unit 1008 in synchronization with the image-formation BD signal. As a result, the corrected image data is output to the laser control unit 1008 in synchronization with the image-formation BD signal.

The image control unit 1007 repeatedly executes the processing in steps S305 to S307 until output of the image data for one face (one page) of the recording medium is completed (YES in step S308).

Thereafter, the CPU 151 repeatedly executes the above-described processing until the print job is ended (YES in step S309).

As described above, in the present exemplary embodiment, the generation unit 1009d sets the time period during which the image-formation BD signal indicating the identified reflection face (in the present exemplary embodiment, the face "1") is "L" to be different from the time period during which the image-formation BD signal indicating another reflection face is "L". The engine control unit 1009 outputs the image-formation BD signal generated by the generation unit 1009d to the image control unit 1007.

The identification unit 1010d counts the time period during which the received image-formation BD signal is "L" to identify the reflection face that deflects the laser light. More specifically, in a case where the mask signal is "L" when the falling edge of the image-formation BD signal is detected, the identification unit 1010d resets and starts the timer 1010e. Further, in a case where the mask signal is "H" when the falling edge of the image-formation BD signal is detected, the identification unit 1010d starts the timer 1010e without resetting the timer 1010e. Further, when the rising edge of the image-formation BD signal is detected, the identification unit 1010d stops the timer 1010e and determines the reflection face based on the counting result of the timer 1010e. As a result, it is possible to prevent the reflection face from being determined erroneously even if the noise is generated when the image-formation BD signal is "L". Therefore, the reflection face can be determined with high precision. As a result, image data can be prevented from being corrected inappropriately.

In the present exemplary embodiment, although counting executed by the timer 1010e is stopped when a rising edge of the image-formation BD signal is detected by the second detection unit 1010b, the counting may be executed continuously. Based on the counted time of the timer 1010e when the rising edge of the image-formation BD signal is detected by the second detection unit 1010b, the identification unit 1010d determines the time period during which the image-formation BD signal is "L".

Further, in the present exemplary embodiment, if the falling edge of the image-formation BD signal is detected in a state where the mask signal is "H", counting of the timer 1010e is started without being reset. However, counting of the timer 1010e may be reset. In this case, the identification unit 1010d determines the time period during which the image-formation BD signal is "L" through the following processing. Specifically, if the falling edge of the image-formation BD signal is detected in a state where the mask signal is "L", the identification unit 1010d resets and starts the counting executed by the timer 1010e. Then, the identification unit 1010d stores the first counted time as the time counted by the timer 1010e when the rising edge is detected. Thereafter, if the falling edge of the image-formation BD signal is detected in a state where the mask signal is "H", the identification unit 1010d resets and starts the counting executed by the timer 1010e. Then, the identification unit 1010d stores the second counted time as the time counted by the timer 1010e when the rising edge is detected. The identification unit 1010d determines the time period during which the image-formation BD signal is "L" based on a total time of the first counted time and the second counted time.

Further, in the present exemplary embodiment, although the identification unit 1010d determines the face number based on the time period during which the image-formation BD signal output from the engine control unit 1009 is "L", it is not limited thereto. For example, the identification unit 1010d may determine the face number based on the time period during which the image-formation BD signal output from the engine control unit 1009 is "H".

Further, in the present exemplary embodiment, although an exemplary embodiment of an electrophotographic monochrome copying machine has been described, a configuration of the present exemplary embodiment is also applicable to an electrophotographic multi-color copying machine.

Further, in the present exemplary embodiment, although the engine control unit 1009 starts counting the number of pulses of the output image-formation BD signal when output of the image-formation BD signal is started, it is not limited thereto. For example, the engine control unit 1009 may start counting the number of pulses of the output image-formation BD signal when the image control unit 1007 starts outputting the image data to the laser control unit 1008.

The laser light source 1000, the polygon mirror 1002, the photosensitive drum 708, the BD sensor 1004, and the engine control unit 1009 of the present exemplary embodiment are included in the image forming unit.

Further, in the present exemplary embodiment, although the image control unit 1007 outputs the corrected image data to the laser control unit 1008, it is not limited thereto. For example, the image control unit 1007 may output the corrected image data to the engine control unit 1009, and the engine control unit 1009 outputs the image data to the laser control unit 1008. In other words, any configuration may be possible as long as the corrected data can be output to the image forming unit from the image control unit 1007.

Further, in the present exemplary embodiment, although the sheet sensor 726 is arranged on the upstream side of the transfer position and the downstream side of the registration roller 723, it is not limited thereto. For example, the sheet sensor 726 may be arranged on the upstream side of the registration roller 723.

Further, in the present exemplary embodiment, as illustrated in FIGS. 4A, 4B, and 5, although the face number is identified based on the period of the BD signal, a method of identifying the face number is not limited thereto. For example, the face number may be identified based on a phase difference between a signal indicating a rotation period of a motor for rotationally driving a polygon mirror (e.g., a signal of an encoder, or a frequency-generator (FG) signal) and a BD signal.

According to the disclosure, a reflection face can be determined with high precision.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-019475, filed Feb. 6, 2018, which is hereby incorporated by reference herein in its entirety.

What is claimed is:

1. An information processing apparatus connected to an image forming apparatus including an image forming unit, the image forming unit comprising:
   a first receptor configured to receive image data;
   a light source configured to output light based on the image data received by the first receptor;
   a photosensitive member;
   a rotational polygon mirror having a plurality of reflection faces, and configured to be rotated to scan the photosensitive member by deflecting light output from the light source by using the plurality of reflection faces;
   a light receiving unit including a light receiving element for receiving the light deflected by the rotational polygon mirror;
   an identifier configured to identify a reflection face used for scanning the photosensitive member from among the plurality of reflection faces; and
   a generator configured to generate a signal including a signal of a first level and a signal of a second level, the generator generating the signal based on information about the reflection face identified by the identifier to cause a period of the first level of the signal corresponding to the identified reflection face to be longer than a period of the first level of the signal corresponding to a reflection face other than the identified reflection face from among the plurality of reflection faces, and
   the information processing apparatus comprising:
   a second receptor configured to receive the signal;
   a first detector configured to detect a first change in which a level of the signal received by the second receptor is changed from the second level to the first level;
   a second detector configured to detect a second change in which a level of the signal received by the second receptor is changed from the first level to the second level;
   a determiner configured to determine whether the first change detected at a first timing is a change corresponding to the identified reflection face based on time period from the first timing at which the first change is detected to a timing at which the second change is firstly detected after the first timing;
   a corrector configured to correct image data corresponding to a scanning line of the light with correction data corresponding to the reflection face corresponding to the scanning line based on a determination result of the determiner; and
   an output unit configured to output image data corrected by the corrector to the image forming unit,
   wherein, when the first change is newly detected in a predetermined period starting from the first timing serving as a starting point, based on a time period from a second timing at which the first change is newly detected in the predetermined period to a timing at which the second change is firstly detected after the second timing and a time period from the first timing as the starting point of the predetermined period that includes the second timing to a timing at which the second change is lastly detected before the second timing, the determiner determines whether the first change detected at the first timing as the starting point of the predetermined period is a change corresponding to the identified reflection face, and
   wherein the output unit outputs image data corrected by the corrector to the image forming unit when the first detector detects the first change in a period other than the predetermined period, and does not output the corrected image data even if the first detector detects the first change within the predetermined period.

2. The information processing apparatus according to claim 1, wherein the predetermined period is previously set to a period shorter than a time period from a timing at which the light receiving unit receives the light to a next timing at which the light receiving unit firstly receives the light after the timing.

3. The information processing apparatus according to claim 1,
   wherein the determiner updates, after the determiner determines that the first change detected at the first timing serving as the starting point of the predetermined period is a change corresponding to the identified reflection face, face information indicating the reflection face every time the first change is detected in a period other than the predetermined period, and
   wherein the corrector corrects, based on the face information, image data corresponding to a scanning line of the light with correction data corresponding to the reflection face corresponding to the scanning line.

4. The information processing apparatus according to claim 1, further comprising a second output unit configured to output a second signal indicating the predetermined period,
   wherein the determiner determines, when the first change is newly detected in a period in which the second signal is being output from the second output unit, based on a time period from a second timing at which the first change is newly detected to a timing at which the second change is firstly detected after the second timing and a time period from the first timing as the starting point of the predetermined period that includes the second timing to a timing at which the second change is lastly detected before the second timing, whether the first change detected at the first timing is a change corresponding to the identified reflection face and updates face information indicating the reflection face every time the first change is detected in a period in which the second signal is not output after determining the reflection face, and wherein the output unit outputs the corrected image data in a period in which the second signal is not output from the second output unit if the first detector detects the first change, and does not output the corrected image data in a period in which the second signal is not output from the second output unit even if the first detector detects the first change.

5. The information processing apparatus according to claim 1,
wherein the determiner includes a counting unit for counting time,
wherein the determiner starts counting time by the counting unit after resetting a counting result of the counting unit when the first change is detected in a period other than the predetermined period, and starts counting time by the counting unit without resetting a counting result of the counting unit when the first change is detected within the predetermined period, and
wherein the determiner determines, based on a counting result of the counting unit acquired when the second change is detected, whether the first change detected at the first timing serving as the starting point of the predetermined period is a change corresponding to the identified reflection face.

6. The information processing apparatus according to claim 1, wherein the determiner determines, in a case where a time period from the first timing serving as the starting point of the predetermined period to a timing at which the second change is detected is longer than predetermined time, that the first change detected at the first timing serving as the starting point of the predetermined period is a change corresponding to the identified reflection face.

7. The information processing apparatus according to claim 6, wherein the predetermined time is shorter than a period of the first level of the signal corresponding to the identified reflection face, and longer than a period of the first level of the signal corresponding to the reflection face other than the identified reflection face.

8. The information processing apparatus according to claim 1,
wherein the first change is a change from a high level as the second level of the signal to a low level as the first level of the signal, and
wherein the second change is a change from the low level of the signal to the high level of the signal.

9. The information processing apparatus according to claim 1, wherein the output unit starts outputting, when the first change is detected a predetermined number of times in a period other than the predetermined period after an instruction for forming an image on the recording medium is output to the image forming unit, the corrected image data to the image forming unit.

10. The information processing apparatus according to claim 1,
wherein a substrate on which the second receptor is arranged is a substrate different from a substrate on which the generator is arranged, and
wherein the substrate on which the second receptor is arranged is connected to the substrate on which the generator is arranged through a cable.

11. An image forming apparatus including a first generator which generates an image data and an image forming unit which forms an image on a recording medium based on the image data output from the first generator, the image forming unit comprising:
a first receptor configured to receive image data from the first generator;
a light source configured to output light based on the image data received by the first receptor;
a photosensitive member;
a rotational polygon mirror having a plurality of reflection faces, and configured to be rotated to scan the photosensitive member by deflecting light output from the light source by using the plurality of reflection faces;
a light receiving unit including a light receiving element for receiving the light deflected by the rotational polygon mirror;
an identifier configured to identify a reflection face used for scanning the photosensitive member from among the plurality of reflection faces; and
a second generator configured to generate a signal including a signal of a first level and a signal of a second level, the second generator generating the signal based on information about the reflection face identified by the identifier to cause a period of the first level of the signal corresponding to an identified reflection face to be longer than a period of the first level of the signal corresponding to a reflection face other than the identified reflection face from among the plurality of reflection faces, and
the first generator comprising:
a second receptor configured to receive the signal;
a first detector configured to detect a first change in which a level of the signal received by the second receptor is changed from the second level to the first level;
a second detector configured to detect a second change in which a level of the signal received by the second receptor is changed from the first level to the second level;
a determiner configured to determine whether the first change detected at a first timing is a change corresponding to the identified reflection face based on a time period from the first timing at which the first change is detected to a timing at which the second change is firstly detected after the first timing;
a corrector configured to correct image data corresponding to a scanning line of the light with correction data corresponding to the reflection face corresponding to the scanning line based on a determination result of the determiner; and
an output unit configured to output image data corrected by the corrector to the image forming unit,
wherein the determiner determines, when the first change is newly detected in a predetermined period starting from the first timing serving as a starting point, based on a time period from a second timing at which the first change is newly detected in the predetermined period to a timing at which the second change is firstly detected after the second timing and a time period from the first timing as the starting point of the predetermined period that includes the second timing to a timing at which the second change is lastly detected before the second timing, whether the first change detected at the first timing as the starting point of the predetermined period is a change corresponding to the identified reflection face, and wherein the output unit outputs the image data corrected by the corrector to the image forming unit when the first detector detects the first change in a period other than the predetermined period, and does not output the corrected image data even if the first detector detects the first change within the predetermined period.

12. An information processing apparatus connected with an image forming apparatus including an image forming unit, the image forming unit comprising:
a first receptor configured to receive image data;
a light source configured to output light based on the image data received by the first receptor;
a photosensitive member;
a rotational polygon mirror having a plurality of reflection faces, and configured to be rotated to scan the photosensitive member by deflecting light output from the light source by using the plurality of reflection faces;
a light receiving unit including a light receiving element for receiving the light deflected by the rotational polygon mirror;
an identifier configured to identify a reflection face used for scanning the photosensitive member from among the plurality of reflection faces; and
a generator configured to generate a signal including a signal of a first level and a signal of a second level, the generator generating the signal based on information about the reflection face identified by the identifier to make a period of the first level of the signal corresponding to an identified reflection face be longer than a period of the first level of the signal corresponding to a reflection face other than the identified reflection face from among the plurality of reflection faces, and
the information processing apparatus comprising:
a second receptor configured to receive the signal;
a first detector configured to detect a first change in which a level of the signal received by the second receptor is changed from the second level to the first level;
a second detector configured to detect a second change in which a level of the signal received by the second receptor is changed from the first level to the second level;
a measuring unit configured to measure a period of the first level of the signal in a predetermined period starting from a first timing at which the first change is detected as a starting point;
a determiner configured to determine the first change detected at the first timing serving as the starting point of the predetermined period as a change corresponding to the identified reflection face in a case where a measurement result acquired by the measuring unit is longer than a predetermined time period;
a corrector configured to correct image data corresponding to a scanning line of the light with correction data corresponding to the reflection face corresponding to the scanning line based on a determination result of the determiner; and
an output unit configured to output image data corrected by the corrector to the image forming unit,
wherein the measuring unit determines, when the first change is newly detected in the predetermined period, based on a time period from the second timing at which the first change is newly detected to a timing at which the second change is firstly detected after the second timing and a time period from the first timing serving as the starting point of the predetermined period that includes the second timing to a timing at which the second change is lastly detected before the second timing, a period of the first level of the signal in the predetermined period, and wherein the output unit outputs image data corrected by the corrector to the image forming unit when the first detector detects the first change in a period other than the predetermined period, and does not output the corrected image data even if the first detector detects the first change within the predetermined period.

13. The information processing apparatus according to claim 12, wherein the predetermined period is previously set to a period shorter than a time period from a timing at which the light receiving unit receives the light to a next timing at which the light receiving unit firstly receives the light after the timing.

14. The information processing apparatus according to claim 12,
wherein the determiner updates, after the determiner determines that the first change detected at the first timing serving as the starting point of the predetermined period is a change corresponding to the identified reflection face, face information indicating the reflection face every time the first change is detected in a period other than the predetermined period, and
wherein the corrector corrects image data corresponding to a scanning line of the light with correction data corresponding to the reflection face corresponding to the scanning line.

15. The information processing apparatus according to claim 12, further comprising a second output unit configured to output a second signal indicating the predetermined period,
wherein the measuring unit determines, when the first change is newly detected in a period in which the second signal is being output from the second output unit, based on a time period from the second timing at which the first change is newly detected to a timing at which the second change is firstly detected after the second timing and a time period from the first timing serving as the starting point of the predetermined period that includes the second timing to a timing at which the second change is lastly detected before the second timing, a period of the first level of the signal in the predetermined period.

16. The information processing apparatus according to claim 12, wherein the measuring unit starts the measurement after resetting the measurement result when the first change is detected in a period other than the predetermined period, and starts the measurement without resetting the measurement result when the first change is detected in the predetermined period.

17. The information processing apparatus according to claim 12, wherein the predetermined time is shorter than a period of the first level of the signal corresponding to the identified reflection face and longer than a period of the first level of the signal corresponding to another reflection face.

18. The information processing apparatus according to claim 12,
wherein the first change is a change from a high level as the second level of the signal to a low level as the first level of the signal, and
wherein the second change is a change from the low level of the signal to the high level of the signal.

19. The information processing apparatus according to claim 12,
wherein a substrate on which the second receptor is arranged is a substrate different from a substrate on which the generator is arranged, and
wherein the substrate on which the second receptor is arranged is connected to the substrate on which the generator is arranged through a cable.

20. An image forming apparatus including a first generator which generates image data and an image forming unit which forms an image on a recording medium based on the image data output from the first generator, the image forming unit comprising:
a first receptor configured to receive image data;
a light source configured to output light based on the image data received by the first receptor;
a photosensitive member;
a rotational polygon mirror having a plurality of reflection faces, and configured to be rotated to scan the photosensitive member by deflecting light output from the light source by using the plurality of reflection faces;
a light receiving unit including a light receiving element for receiving the light deflected by the rotational polygon mirror;
an identifier configured to identify a reflection face used for scanning the photosensitive member from among the plurality of reflection faces; and
a generator configured to generate a signal including a signal of a first level and a signal of a second level, the generator generating the signal based on information about the reflection face identified by the identifier to make a period of the first level of the signal corresponding to the identified reflection face be longer than a period of the first level of the signal corresponding to a reflection face other than the identified reflection face from among the plurality of reflection faces, and
the first generator comprising:
a second receptor configured to receive the signal;
a first detector configured to detect a first change in which a level of the signal received by the second receptor is changed from the second level to the first level;
a second detector configured to detect a second change in which a level of the signal received by the second receptor is changed from the first level to the second level;
a measuring unit configured to measure a period of the first level of the signal in the predetermined period starting from a first timing at which the first change is detected as a starting point;
a determiner configured to determine the first change detected at the first timing serving as the starting point of the predetermined period as a change corresponding to the identified reflection face in a case where a measurement result acquired by the measuring unit is longer than a predetermined time period;
a corrector configured to correct image data corresponding to a scanning line of the light with correction data corresponding to the reflection face corresponding to the scanning line based on a determination result of the determiner; and
an output unit configured to output image data corrected by the corrector to the image forming unit,
wherein the measuring unit determines, when the first change is newly detected in the predetermined period, based on a time period from the second timing at which the first change is newly detected to a timing at which the second change is firstly detected after the second timing and a time period from the first timing serving as the starting point of the predetermined period that includes the second timing to a timing at which the second change is lastly detected before the second timing, a period of the first level of the signal in the predetermined period, and
wherein the output unit outputs image data corrected by the corrector to the image forming unit when the first detector detects the first change in a period other than the predetermined period, and does not output the corrected image data even if the first detector detects the first change in the predetermined period.

* * * * *